United States Patent
Chu

(10) Patent No.: US 10,489,372 B2
(45) Date of Patent: Nov. 26, 2019

(54) DATA STORAGE METHODS, QUERY METHODS, AND APPARATUSES THEREOF

(71) Applicants: ALIBABA GROUP HOLDING LIMITED, George Town, Grand Cayman (KY); Xiaoying Chu, Hangzhou (CN)

(72) Inventor: Xiaoying Chu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 279 days.

(21) Appl. No.: 15/324,661

(22) PCT Filed: Jun. 17, 2015

(86) PCT No.: PCT/CN2015/081651
§ 371 (c)(1),
(2) Date: Jan. 6, 2017

(87) PCT Pub. No.: WO2016/004813
PCT Pub. Date: Jan. 14, 2016

(65) Prior Publication Data
US 2018/0181606 A1 Jun. 28, 2018

(30) Foreign Application Priority Data
Jul. 7, 2014 (CN) .......................... 2014 1 0320794

(51) Int. Cl.
*G06F 16/22* (2019.01)
*G06F 16/00* (2019.01)
(Continued)

(52) U.S. Cl.
CPC .......... *G06F 16/2282* (2019.01); *G06F 16/00* (2019.01); *G06F 16/22* (2019.01); *G06F 16/2457* (2019.01); *G06F 16/283* (2019.01)

(58) Field of Classification Search
CPC ...... G06F 16/2282; G06F 16/00; G06F 16/22; G06F 16/2457; G06F 16/283
See application file for complete search history.

(56) References Cited

U.S. PATENT DOCUMENTS 5,732,257 A * 3/1998 Atkinson .................. G06F 8/51
5,943,665 A * 8/1999 Guha .................... G06F 16/244
707/718
(Continued)

FOREIGN PATENT DOCUMENTS

| CN | 101533414 A | 9/2009 |
|---|---|---|
| CN | 102999526 A | 3/2013 |

OTHER PUBLICATIONS

PCT International Search Report dated Sep. 23, 2015, issued in corresponding International Application No. PCT/CN2015/081651 (5 pages).
(Continued)

*Primary Examiner* — Grace Park
*Assistant Examiner* — Hubert Cheung
(74) *Attorney, Agent, or Firm* — Finnegan, Henderson, Farabow, Garrett & Dunner, LLP

(57) ABSTRACT

The present application discloses methods for storing data, methods for querying data, and apparatus thereof. A method for storing data may include receiving a data record to be stored. When the data record includes a timestamp, a numerical value generated at a time point identified by the timestamp, and a first combination of identification-field values that can identify the numerical value, the method may also include obtaining a target numerical value and a target time satisfying user query needs, and a second combination of identification-field values as a query condition by the preprocessing of the data record based on the user query needs. The method may further include storing a storage identity representing the second combination of identifica-
(Continued)

(a)

(b)

tion-field values, the target time, and the target numerical value into a second information table correspondingly.

13 Claims, 4 Drawing Sheets

(51) Int. Cl.
*G06F 16/2457* (2019.01)
*G06F 16/28* (2019.01)

(56) References Cited

U.S. PATENT DOCUMENTS

| | | | | |
|---|---|---|---|---|
| 6,189,004 | B1* | 2/2001 | Rassen | G06F 16/2423 |
| 7,392,242 | B1* | 6/2008 | Baccash | G06F 16/24539 |
| 7,739,224 | B1* | 6/2010 | Weissman | G06F 16/283 |
| | | | | 707/794 |
| 8,447,730 | B1* | 5/2013 | Mortazavi | G06F 11/3495 |
| | | | | 707/634 |
| 9,223,612 | B1* | 12/2015 | Feldman | G06F 9/465 |
| 9,507,764 | B2* | 11/2016 | Clifford | G06F 17/243 |
| 9,710,506 | B2* | 7/2017 | Nath | G06F 16/2246 |
| 2002/0010706 | A1* | 1/2002 | Brickell | G06F 16/24539 |
| 2004/0122844 | A1* | 6/2004 | Malloy | G06F 16/283 |
| 2004/0215626 | A1* | 10/2004 | Colossi | G06F 16/24542 |
| 2005/0102326 | A1* | 5/2005 | Peleg | G06F 16/22 |
| 2007/0250472 | A1* | 10/2007 | Dettinger | G06F 16/2455 |
| 2011/0125706 | A1* | 5/2011 | Barber | G06F 16/283 |
| | | | | 707/602 |
| 2012/0197900 | A1* | 8/2012 | Mandre | G06F 16/283 |
| | | | | 707/743 |
| 2013/0151491 | A1 | 6/2013 | Gislason | |
| 2015/0254276 | A1* | 9/2015 | Oliver | G06F 16/22 |
| | | | | 707/741 |
| 2015/0293954 | A1* | 10/2015 | Hsiao | G06F 16/22 |
| | | | | 715/738 |
| 2015/0356094 | A1* | 12/2015 | Gorelik | G06F 16/16 |
| | | | | 707/748 |

OTHER PUBLICATIONS

Supplementary European Search Report dated Mar. 31, 2017, issued in related European Application No. EP 15 81 9546 (2 pgs.).
First Office Action dated May 30, 2018, issued by the State Intellectual Property Office of People's Republic of China issued in counterpart Chinese Patent Application No. 201410320794.X (7 pgs.).
Database Data Warehousing Guide—"8 Basic Materialized Views"; Oracle Database Online Documentation 11g Release 1 (11.1); Sep. 1, 2007; XP055238245; Retrieved from the Internet: http://docs.oracle.com/cd/B28359_01/server.111/b28313/basicmv.htm.
Golfarelli, Matteo et al; "Vertical Fragmentation of Views in Relational Data Warehouses" (15 pgs.).

\* cited by examiner (a)

(b)

(a)

(b)

DATA STORAGE METHODS, QUERY METHODS, AND APPARATUSES THEREOF

CROSS REFERENCE TO RELATED APPLICATIONS

This application is the U.S. national stage application under 35 U.S.C. § 371 of International Application No. PCT/CN2015/081651, filed on Jun. 17, 2015, which claims priority to and the benefits of priority to Chinese Application No. CN 201410320794.X, filed Jul. 7, 2014, both of which are incorporated herein by reference in their entireties.

TECHNICAL FIELD

The present disclosure relates to the field of network technologies, and in particular, to methods for storing data, methods for querying data, and apparatus thereof.

BACKGROUND

With the prevailing of non-relational databases (NOSQL) in the industry, the traditional Relational Database Management System (RDBMS) faces severe challenges. NOSQL supports a storage mode of key-value pairs. However, in many scenarios, it still defines a table like RDBMS and designs a plurality of columns in a table. It also creates secondary indexes for other columns except main keys. In addition, SQL utilizes the NOSQL product like utilizing RDBMS.

When a table has many rows of data, the creation and maintenance of secondary indexes for a plurality of columns in a table will severely influence performance of a storage system. As a result, it causes certain speed degradation of data storage and query.

SUMMARY

The present application discloses, from many aspects, a method for storing data, a method for querying data, and apparatus thereof. They may help to accelerate data storage and query, and improve performance of a storage system.

One aspect of the present disclosure is directed to a method for storing data. The method may include receiving a data record to be stored. When the data record includes a timestamp, a numerical value generated at a time point identified by the timestamp, and a first combination of identification-field values that can identify the numerical value, the method may also include obtaining a target numerical value and a target time satisfying user query needs, and a second combination of identification-field values as a query condition by the preprocessing of the data record based on the user query needs. The method may further include storing a storage identity representing the second combination of identification-field values, the target time, and the target numerical value into a second information table correspondingly. The method may further include storing the first combination of identification-field values into a first information table. The first combination of identification-field values may include one type of values of a time-independent multi-dimensional identification field.

Another aspect of the present disclosure is directed to an apparatus for storing data. The apparatus may include a receiving module that receives a data record to be stored. The apparatus may also include a first storage module. When the data record includes a timestamp, a numerical value generated at a time point identified by the timestamp, and a first combination of identification-field values that can identify the numerical value, the first storage module may obtain a target numerical value and a target time satisfying user query needs, and a second combination of identification-field values as a query condition by the preprocessing of the data record based on the user query needs. The first storage module may also store a storage identity representing the second combination of identification-field values, the target time, and the target numerical value into a second information table correspondingly. The first storage module may further store the first combination of identification-field values into a first information table. The first combination of identification-field values may include one type of values of a time-independent multi-dimensional identification field.

Yet another aspect of the present disclosure is directed to a method for querying data. The method may include receiving a query request. When the query request includes a filtering condition as a query condition, but does not include a target time, the method may include obtaining a first combination of identification-field values satisfying the filtering condition by performing a query, in accordance with the filtering condition, among a plurality of first combinations of identification-field values stored in a first information table. A set of values of the first combination of identification-field values may include one type of values of a time-independent multi-dimensional identification field. The filtering condition may include a set of values of part of the identification field. When the query request includes a second combination of identification-field values and a target time as a query condition, the method may include obtaining a target numerical value corresponding to the target time and the storage identity by performing a query in a second information table in accordance with the storage identity representing the second combination of identification-field values, and the target time.

Yet another aspect of the present disclosure is directed to an apparatus for querying data. The apparatus may include a receiving module that receives a query request. The apparatus may also include a first query module. When the query request includes a filtering condition as a query condition, but does not include a target time, the first query module may obtain a first combination of identification-field values satisfying the filtering condition by performing a query, in accordance with the filtering condition, among a plurality of first combinations of identification-field values stored in a first information table. A set of values of the first combination of identification-field values may include one type of values of a time-independent multi-dimensional identification field. The filtering condition may include a set of values of part of the identification field. The apparatus may further include a second query module. When the query request includes a second combination of identification-field values and a target time as a query condition, the second query module may obtain a target numerical value corresponding to the target time and the storage identity by performing a query in a second information table in accordance with the storage identity representing the second combination of identification-field values, and the target time.

By classifying contents of data records to be stored, the technical solutions of the present application store time-independent contents, for example, values of multi-dimensional identification fields, into a first information table. The first information table stores the contents that are time-independent. Accordingly, the data volume of the contents in the first information table is reduced. The workload of creation and maintenance of secondary indexes is then extremely reduced. As for contents associated to time, the technical solutions of the present disclosure obtain information, for example, a target numerical value, a target time, and a storage identity representing a query condition, that directly satisfies user query needs by the preprocessing of the data record in accordance with user query needs. The data volume of the contents in a second information table can be reduced to a certain extent through the preprocessing. In addition, through storing the target numerical value, the target time, and the storage identity, a second information table does not need to create secondary indexes. Compared with the prior art, the technical solutions of the present application greatly reduce the workload of creation and maintenance of secondary indexes, and decrease the volume of the stored data. Accordingly, these technical solutions accelerate data storage, and improve performance of a storage system. Correspondingly, these technical solutions directly query a second information table for data query without relying on secondary indexes. It is beneficial for acceleration of data query. Even though it sometimes needs to query a first information table, it also provides a higher query speed compared with the prior art because of the reduced secondary indexes of the first information table.

BRIEF DESCRIPTION OF THE DRAWINGS

In order to clearly describe technical proposals in the embodiments of the present disclosure, several drawings that need to be used when describing the embodiments or the prior art are briefly introduced below. Apparently, these drawings described below are merely some embodiments of the present disclosure. Those with ordinary skill in the art can obtain other drawings based on these drawings without creative activity.

DETAILED DESCRIPTION

Figure 1:
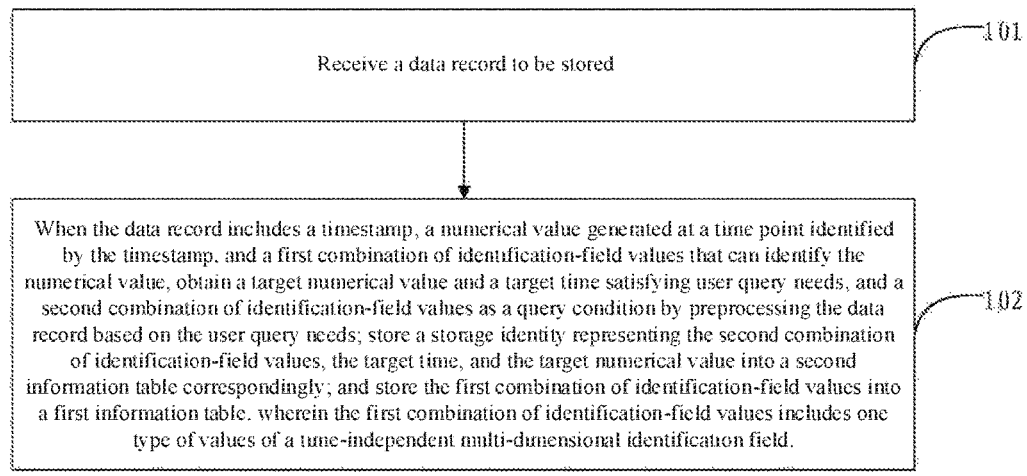
FIG. 1a is an illustrative flow chart of an exemplary method for storing data, according to an embodiment of the present disclosure.
FIG. 1b is an illustrative flow chart of another exemplary method for storing data, according to an embodiment of the present disclosure.
Figure 1:
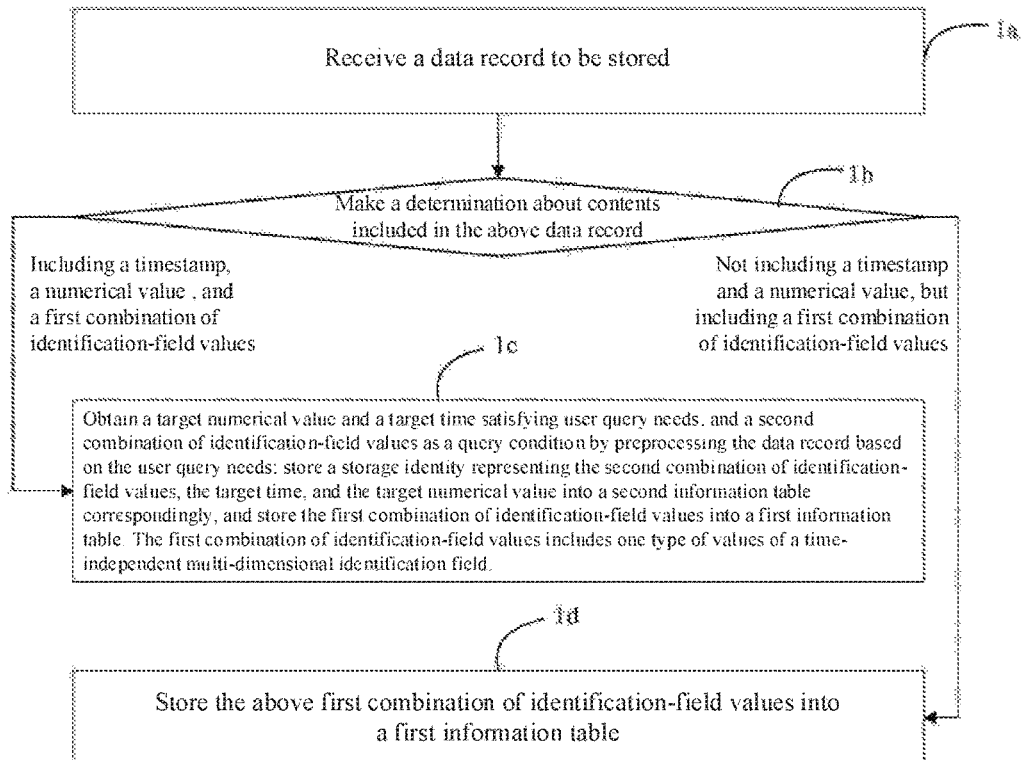

In order to make the objects, technical solutions, and advantages of the embodiments of the present disclosure clear, the technical solutions of the embodiments of the present disclosure will be described below clearly and completely with reference to the drawings. Apparently, the described embodiments are merely a part of the embodiments of the present disclosure, not the all embodiments. Based on these embodiments of the present disclosure, all other embodiments that can be obtained by those with ordinary skill in the art without creative activity should fall within the protection scope of the present disclosure.

Before illustrating the technical solutions of the present disclosure, defects of existing storage solutions are demonstrated in combination with specific application scenarios.

TABLE 1

| Time | Interface | Method | Source | Result | Amount (dollars) |
|---|---|---|---|---|---|
| 2013 Nov. 11 00:00 | Transaction Service (TradeFacade) | Create (Create) | Taobao (Taobao) | Successful (Y) | 999 |
| 2013 Nov. 11 00:00 | TradeFacade | Pay | Taobao | Y | 1999 |
| 2013 Nov. 11 00:00 | TradeFacade | Create | Tmall | Y | 200 |
| 2013 Nov. 11 00:00 | TradeFacade | Pay | Tmall | Y | 2000 |
| 2013 Nov. 11 00:00 | TradeFacade | Pay | Tmall | Failed (N) | 133 |
| 2013 Nov. 12 00:00 | TradeFacade | Create | Tmall | Y | 260 |
| 2013 Nov. 12 00:00 | TradeFacade | Pay | Tmall | Y | 3000 |
| 2013 Nov. 12 00:00 | TradeFacade | Pay | Tmall | N | 266 |
| . . . | | | | | |

Table 1 is one kind of common application scenarios in the data analysis field. The contents in Table 1 are records about various activities in trading systems of third-party payment companies. In Table 1, Interface and Method are common service identification fields in the Service-Oriented Architecture (SOA) field. Interface represents a certain service. Method represents a specific activity under such a service, with Create and Pay representing an order-creation service and an order-payment service under such a service, respectively. Source represents a calling party of such a service comes from Taobao or Tmall. Result, Y/N, just as the name implies, represents that a final result of the service is successful or failed, respectively. Amount is a numerical value, which represents an amount of the transaction.

According to an application's needs, it can perform a query about various information based on Table 1. For example, it can query sums of various combinations of [Interface, Method, Source, Result] at a time moment of 2013-11-11 00:00. For another example, it can query a total sum of [Interface=TradeFacade, Method=Create or Pay] at a time moment of 2013-11-11 00:00. For another example, it can further query about how many possible sources for an order-creation service under a transaction service. For example, Source in Table 1 is corresponding to Taobao and Tmall.

As shown above, it is needed to create and maintain a secondary index for each column, that is, Interface, Method, Source, and Result, in Table 1, to avoid traversing the whole table when performing a query. However, data rows in Table 1 are continuously accumulated as time elapses. When Table 1 has too many data rows, it will become a job at a great cost to create and maintain secondary indexes for a plurality of columns, which will severely influence performance of a storage system and reduce the speeds of data storage and query.

For the problems mentioned above, FIG. 1a is an illustrative flow chart of an exemplary method for storing data, according to an embodiment of the present disclosure. As shown in FIG. 1a, the method includes:

101: receiving a data record to be stored.

102: when the data record includes a timestamp, a numerical value generated at a time point identified by the timestamp, and a first combination of identification-field values that can identify the numerical value, obtaining a target numerical value and a target time satisfying user query needs, and a second combination of identification-field values as a query condition by the preprocessing of the data record based on the user query needs; storing a storage identity representing the second combination of identification-field values, the target time, and the target numerical value into a second information table correspondingly; and storing the first combination of identification-field values into a first information table, wherein the first combination of identification-field values includes one type of values of a time-independent multi-dimensional identification field.

A data record corresponds to a complete group of relevant information in a data source. For example, one row of data in Table 1 is one data record. In this embodiment, a data record can come from, but is not limited to, a service system. Herein the service system may be a service system in any field. For example, it may be a commodity transaction service system, a bank service system, or a toll station management service system.

When a service system has a service to be processed, it generally generates data records. These data records usually need to be stored. For example, when a commodity is transacted, the service system will generate commodity transaction information, such as the commodity name, the transaction time, the transaction sum, and the commodity vendor. One piece of commodity transaction information is one data record. For another example, when a bank carries out a transfer service or a remittance service, it will record information about the transfer or remittance, such as the transfer account or the remittance account, the beneficiary account, the sum of bank transfer or remittance, the date for the transfer or remittance. One piece of bank transfer or remittance record is one data record.

Therefore, a data storage apparatus can receive a data record to be stored that is sent by a service system.

Regardless of the above commodity transaction service system, the bank service system, or the toll station management service system, the generated data records may include contents related to time, and may further include time-independent contents. With reference to Table 1, "Time" and "Sum" will be changed as the time changes. In contrast, the changes of "Interface," "Method," "Source," and "Result" are not related to transaction orders that are increased continuously as the time elapses, but are originated from changes of service rules that have a lower changing frequency. For example, introducing a new merchant, or providing a new service, such as a financial service, will cause a change of service rules.

In Table 1, "Time" and "Sum" are corresponding to a timestamp and a numerical value in this embodiment, respectively. The "Interface," "Method," "Source," and "Result" in Table 1 are corresponding to a multi-dimensional identification field in this embodiment. One type of values of these fields can uniquely identify a sum corresponding to a certain time.

For commodity transactions, the transaction time and the transaction sum are changed as the time changes. In general, they are accumulated as the time elapses. However, a commodity name and a commodity provider, for example, will not be continuously increased as the time elapses once they are determined. They will not change unless a low probability event occurs such as having a new commodity or introducing a new commodity provider. For a bank system, a time for the transfer or remittance and a sum for the transfer or remittance are changed as the time changes, and are generally accumulated as the time elapses. However, a bank name, a bank address, a transfer or remittance account, and a beneficiary account, for example, will not be continuously increased as the time elapses once they are determined. They will not change unless a small probability event occurs such as the bank changes its address or a new user opens an account in this bank.

According to the above analysis, the contents related to time in a data record are generally a service occurrence time and a numerical value generated due to a service occurred at the service occurrence time. In this embodiment, the service occurrence time is marked as a timestamp, and a numerical value generated by a service occurred at a time point identified by the timestamp is marked as a numerical value generated at a time point identified by the timestamp. For example, considering a commodity transaction, the timestamp is a time when a commodity transaction is generated, and the numerical value generated at a time point identified by the timestamp is a sum of the commodity transaction. For another example, considering a bank system, the timestamp is a time point when the transfer or remittance occurs, and the numerical value generated at a time point identified by the timestamp is a sum of the transfer or remittance.

It is further found that the time-independent contents in a data record generally refer to one type of values of a multi-dimensional identification field that has a low changing frequency and can identify the numerical value generated at a time point identified by the timestamp. A value of an identification field may be called an identification-field value. A combination of values of a multi-dimensional identification field may be named as a first combination of identification-field values. There are multiple types of values for the same multi-dimensional identification field. It means that it is possible to have a plurality of first combinations of identification-field values. For example, for commodity transactions, one transaction is uniquely identified by the values of fields such as the commodity name and the commodity provider. For another example, for bank systems, one transfer or remittance service is uniquely identified by the values of fields such as the bank name, the transfer or remittance account, and the beneficiary account.

After receiving a data record, the data storage apparatus may make a determination on contents included in the data record. When determining that the data record includes a timestamp, a numerical value generated at a time point identified by the timestamp, and a first combination of identification-field values that can identify the numerical value, it may obtain a target numerical value and a target time satisfying user query needs, and a second combination of identification-field values as a query condition by the preprocessing of the data record based on the user query need. It may also store a storage identity representing the second combination of identification-field values, the target time, and the target numerical value into a second information table correspondingly. It may further store the first combination of identification-field values into a first information table. It should be noted that, if the first information table already has a first combination of identification-field values, it can directly replace the existing first combination of identification-field values. If the first information table does not have a first combination of identification-field values, it directly stores the first combination of identification-field values into the first information table.

The second combination of identification-field values refers to one type of values of a multi-dimensional identification field and is used as a query condition when performing a query. The second combination of identification-field values and the first combination of identification-field values may correspond to the same number of identification fields, or may correspond to different numbers of identification fields. The number of identification fields corresponding to the second combination of identification-field values should be smaller than or equal to that of identification fields corresponding to the first combination of identification-field values. With reference to the above Table 1, the second combination of identification-field values may be one type of values of two identification fields, "Interface" and "Method." It may be another type of values of three identification fields, "Interface," "Method," and "Source."

In this embodiment, the data storage apparatus is preconfigured with a classification rule for making classifications on contents in a data record. The data storage apparatus may make classifications on the contents in the received data record based on the classification rule. For example, the classification rule may directly stipulate that the fields of a timestamp and a numerical value in a data record are treated as contents related to time, and the other fields are treated as time-independent contents.

In this embodiment, the data storage apparatus classifies contents in a data record. One class is contents related to time, such as a timestamp and a numerical value. The other class is time-independent contents, such as the values of a multi-dimensional identification field. That is a first combination of identification-field values. Through a first information table and a second information table, the data storage apparatus respectively stores the time-independent contents and the contents related to time based on their classes. In this way, the first information table stores the time-independent contents, which has a lower data volume. It thereby greatly reduces workload on creation and maintenance of secondary indexes. Correspondingly, when it needs to query the first information table, the query speed can be increased because the first information table maintains fewer secondary indexes.

In addition, the data storage apparatus may acquire user query needs beforehand. The user query needs mentioned herein refer to queries that the user may perform after the data record is stored. Directed to different service systems, the user query needs may be different. Once a service system corresponding to the data record is determined, the user query needs are generally determined accordingly. For example, considering commodity transaction service systems, the user may need to look up for information about a transaction sum involved in each of all transactions buying commodities provided by a designated commodity provider. The user may also need to look up for information about a total sum of transaction sums involved in commodity transactions that occur in a designated time period. The user may also need to look up for information about a transaction sum involved in each transaction buying a designated commodity within a designated time period. The designated commodity provider, the designated time period, and the designated commodity mentioned in the above example are query conditions in the user query needs.

As mentioned above, for contents related to time, before storing the data record, the data storage apparatus firstly preprocesses the data record based on the user query needs to obtain information satisfying the user query needs, including a target numerical value, a target time, and a second combination of identification-field values as a query condition. It may also use a storage identity that can represent the second combination of identification-field values to replace the second combination of identification-field values. Through the above processing, the second information table stores three types of information: the storage identity, the target time, and the target numerical value. Therefore, the second information table, compared with a pure key-value pair table in the prior art, is merely added with the target time. The target time may be used as a main key of the second information table. There is no need to create secondary indexes for the other two types of information. Therefore, the second information table not only has a reduced data volume, but also does not need to create and maintain secondary indexes. In addition, the information stored in the second information table is the information that already satisfies the query needs. Thus, during the query process, when receiving a query request, it can directly obtain a query result without making calculations. It advantageously increases the query speed.

It should be noted that the above target numerical value may be a numerical value in the data record. In some embodiments, the target numerical value may be obtained after implementing a certain processing on the numerical value in the data record based on the query request. For example, if the query request is querying about a numerical value in each data record, the target numerical value is a numerical value in the data record. If the query request is querying about a sum of numerical values in data records generated in each time period based on a preset time period, the target numerical value is a sum of numerical values in all data records within each time period. In addition, the above target time may be a timestamp in the data record. In some embodiments, it may be a time associated with the timestamp and determined based on the query request. For example, if the query request is querying about a numerical value in each data record, the target time is a timestamp in the data record. If the query request is querying about a sum of numerical values in data records generated in each time period based on a preset time period, the target time is a time point corresponding to each querying time period.

Correspondingly, for the above second combination of identification-field values as a query condition, if the query condition includes all identification-field values of a multi-dimensional identification field, the second combination of identification-field values is equivalent to the first combination of identification-field values. If the query condition merely includes the values of a part of identification fields of the multi-dimensional identification field, the second combination of identification-field values is merely the values of the part of identification fields, which is different from the first combination of identification-field values.

FIG. 1b is a schematic flow chart of a data storage method according to another embodiment of the present disclosure. As shown in FIG. 1b, the method includes:

Step 1a: receiving a data record to be stored;

Step 1b: making a determination about contents included in the above data record. If the data record includes a timestamp, a numerical value generated at a time point identified by the timestamp, and a first combination of identification-field values that can identify the numerical value, Step 1c is executed. If the data record does not include the timestamp and the numerical value generated at the time point identified by the timestamp, but includes the first combination of identification-field values that can identify the numerical value, Step 1d is executed.

Step 1c: obtaining a target numerical value and a target time satisfying user query needs, and a second combination of identification-field values as a query condition by the preprocessing of the data record based on the user query needs; storing a storage identity representing the second combination of identification-field values, the target time, and the target numerical value into a second information table correspondingly, and storing the first combination of identification-field values into a first information table. The first combination of identification-field values includes one type of values of a time-independent multi-dimensional identification field.

Step 1d: storing the above first combination of identification-field values into a first information table.

Please note that this embodiment may be implemented based on the embodiment shown in FIG. 1. The same or similar parts as the embodiment shown in FIG. 1 will not be described herein repeatedly.

In this embodiment, it is considered that the values of a multi-dimensional identification field (that is, the first combination of identification-field values) may be changed. For example, "Interface," "Method," "Source," and "Result" in Table 1 may be changed as the service rule changes. Thus, after receiving a data record, whether the data record includes a timestamp and a numerical value generated at a time point identified by the timestamp is determined. If the data record does not include the timestamp and the numerical value generated at the time point identified by the timestamp, but includes the first combination of identification-field values that can identify the numerical value, it indicates that the contents included in the data record are time-independent. That is the first combination of identification-field values. Thus, it needs to store the first combination of identification-field values into the first information table. Since no content related to time is involved here, it does not perform any operation on the second information table. The method provided in this embodiment can be applied to users' various storage needs.

In some embodiments, in the above Step 102 or Step 1c or Step 1d, the operation of storing the first combination of identification-field values into the first information table includes:

sending a first writing request to a first apparatus where the first information table is stored in order to enable the first apparatus to write the first combination of identification-field values into the first information table when determining that the first information table does not include the first combination of identification-field values. The first writing request includes the first combination of identification-field values.

Specifically, the first writing request is sent to the first apparatus where the first information table is stored. The first writing request carries the above first combination of identification-field values. After receiving the first writing request, the first apparatus obtains the first combination of identification-field values from the first writing request, and queries in the first information table to see whether the first combination of identification-field values already exists in the first information table. If the first combination of identification-field values already exists, it will ignore the first combination of identification-field values carried in the first writing request. If the first combination of identification-field values does not exist, it will write the first combination of identification-field values into the first information table.

In some embodiments, in the above Step 102 or Step 1c, the step of storing a storage identity representing the second combination of identification-field values, the target time, and the target numerical value into a second information table includes:

sending a second writing request to a second apparatus where the second information table is stored in order to enable the second apparatus to determine the storage identity representing the second combination of identification-field values and write the storage identity, the target time, and the target numerical value correspondingly into the second information table. The second writing request includes the second combination of identification-field values, the target time, and the target numerical value.

Specifically, the second writing request is sent to the second apparatus where the second information table is stored. The second writing request carries the second combination of identification-field values, the target time, and the target numerical value. After receiving the second writing request, the second apparatus obtains the second combination of identification-field values, the target time, and the target numerical value from the second writing request, and uniquely maps the second combination of identification-field values into a storage identity. The second apparatus then correspondingly stores the storage identity, the target time, and the target numerical value into the second information table. Herein, the number of bytes used by storing the storage identity representing the second combination of identification-field values is far less than that used by storing the second combination of identification-field values. Therefore, through storing the storage identity representing the second combination of identification-field values, it is helpful for saving a storage space and performing a query.

The first information table and the second information table may be stored in the same apparatus, or may be separately stored in different apparatuses. In other words, the above first apparatus and the second apparatus may be the same apparatus, or may also be different apparatuses. Preferably, since structures of data stored in two information tables are quite different from each other, structures for implementing the two information tables are quite different as well. Thus, they may be stored in different apparatuses.

In some embodiments, the first information table described in the above embodiment may be called a dimension table. Correspondingly, the second information table may be called, without being limited to, a record table.

For an application scenario shown in Table 1, after storing according to the method provided in this embodiment, Table 2 and Table 3 can be obtained. Table 2 is the first information table, and Table 3 is the second information table.

TABLE 2

| Interface | Method | Source | Result |
|---|---|---|---|
| TradeFacade | Create | Taobao | Y |
| TradeFacade | Pay | Taobao | Y |
| TradeFacade | Create | Tmall | Y |
| TradeFacade | Pay | Tmall | Y |
| TradeFacade | Pay | Tmall | N |
| ... | | | |

TABLE 3

| Storage identity | Time | Sum (RMB) |
|---|---|---|
| ID1 | 2013 Nov. 11 00:00 | 1459 |
| ID2 | 2013 Nov. 11 00:00 | 7398 |
| ID3 | 2013 Nov. 11 00:00 | 6999 |
| ID4 | 2013 Nov. 11 00:00 | 399 |
| ... | | |

Table 2 stores a combination of values of "Interface," "Method," "Source," and "Result." It is the first combination of identification-field values. The number of data rows in Table 2 is far fewer than that of data rows in Table 1. Thus, the workload of creation and maintenance of secondary indexes for Table 2 is greatly reduced. It greatly decreases influences on a storage system, and advantageously enhances storage efficiency.

Table 3 stores the target numerical value (corresponding to "Sum" in Table 3), the target time (corresponding to "Time" in Table 3) and the storage identity obtained after preprocessing in order to satisfy the user query needs. In Table 3, the first row represents: a total sum of [Interface=TradeFacade, Method=Create] at the time moment of 2013-11-11 00:00. The second combination of identification-field values (that is, a query condition) represented by ID1 is: [Interface=TradeFacade, Method=Create]. The second row represents: a total sum of [Interface=TradeFacade, Method=Pay] at a time moment of 2013-11-11 00:00. The second combination of identification-field values (that is, a query condition) represented by ID2 is: [Interface=TradeFacade, Method=Pay]. The third row represents: a total sum of [Interface=TradeFacade, Method=Pay, and Result=Y] at a time moment of 2013-11-11 00:00. The second combination of identification-field values (that is, a query condition) represented by ID3 is: [Interface=TradeFacade, Method=Pay, and Result=Y]. The fourth row represents: a total sum of [Interface=TradeFacade, Method=Pay, and Result=N] at a time moment of 2013-11-11 00:00. The second combination of identification-field values (that is, a query condition) represented by ID4 is: [Interface=TradeFacade, Method=Pay, and Result=N]. In Table 3, two columns, the storage identity and the sum, form a key-value pair, which do not need to create indexes. The column of time may be used as a main key. That is to say, there is no need to create secondary indexes for Table 3. It further reduces influences on a storage system and advantageously enhances storage efficiency.

As shown in the above analysis, through making classifications on contents in the data record to be stored, the method illustrated in the embodiment stores the time-independent contents, for example, a value of a multi-dimensional identification field, into the first information table. Thus, the first information table stores the time-independent contents, which has a lower data volume. It greatly reduces the workload of creation and maintenance of secondary indexes. For the contents related to time, the data record is preprocessed based on the user query needs to directly obtain information satisfying the user query needs, including the target numerical value, the target time, and the storage identity representing the query condition. Through preprocessing, a data volume in a second information table can be reduced to a certain extent. In addition, through storing the target numerical value, the target time, and the storage identity, there is no need to create secondary indexes for the second information table. Compared with the prior art, this embodiment greatly reduces the workload of creation and maintenance of secondary indexes. The data volume for being stored is also reduced. It greatly increases a data storage speed and enhances a performance of a storage system. Correspondingly, considering performing data query, when it directly queries the second information table, it does not rely on secondary indexes, which advantageously increases a query speed. Even if it needs to query the first information table, the query speed is increased as well because the first information table maintains fewer secondary indexes, compared with the prior art.

In addition, the second information table stores neither statistical results at complete dimensions, nor original transaction records one by one, but directly stores the required query results. The advantages brought hereby are apparent. When performing a query, it can directly retrieve the storage identities, without using any secondary index, which is helpful for increasing a query speed.

With reference to the data storage method described in the above embodiment of the present disclosure, a flow of a data query method of the present disclosure is illustrated below.

Figure 2:
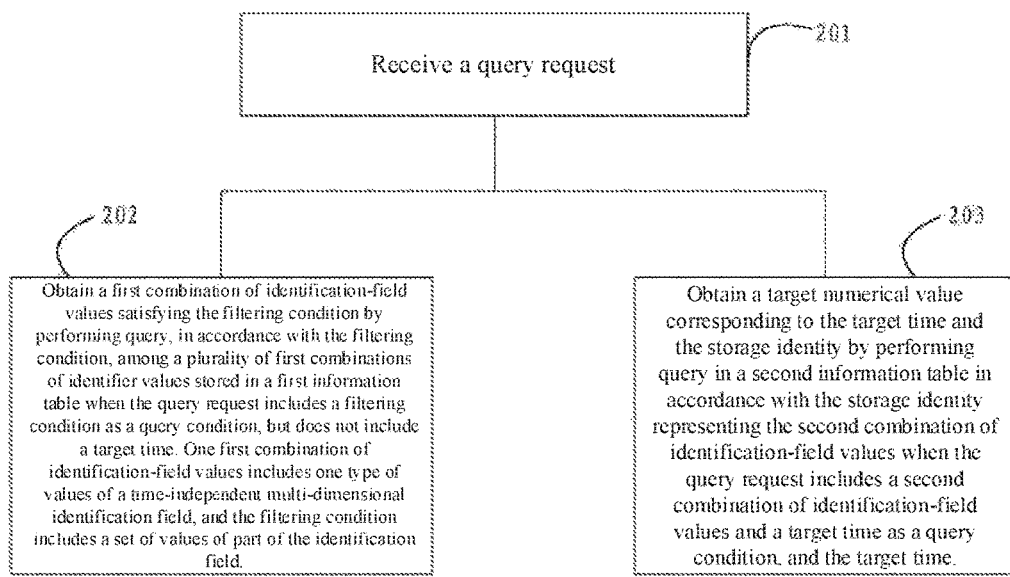
FIG. 2 is an illustrative flow chart of an exemplary method for querying data, according to an embodiment of the present disclosure.

FIG. 2 is a schematic flow chart of a data query method provided in an embodiment of the present disclosure. As shown in FIG. 2, the method includes:

201: receiving a query request.

202: obtaining a first combination of identification-field values satisfying the filtering condition by performing a query, in accordance with the filtering condition, among a plurality of first combinations of identification-field values stored in a first information table when the query request includes a filtering condition as a query condition, but does not include a target time. A set of values of the first combination of identification-field values includes one type of values of a time-independent multi-dimensional identification field, and the filtering condition includes a set of values of part of the identification field.

203: obtaining a target numerical value corresponding to the target time and the storage identity by performing a query in a second information table in accordance with the storage identity representing the second combination of identification-field values when the query request includes a second combination of identification-field values and a target time as a query condition, and the target time.

Specifically, when the user has a query request, a query request is sent to an execution entity of this embodiment, for example, a data query apparatus. The query request includes information required for performing a query.

The data query apparatus receives the query request, and determines contents included in the query request. When determining that the query request includes the filtering condition but does not include the target time, it indicates that the query request is used for querying the values of a multi-dimensional identification field satisfying the filtering condition. Thus, it directly performs query in a plurality of first combination of identification-field values stored in the first information table according to the filtering condition to obtain the first combination of identification-field values satisfying the filtering condition. There may be one or a plurality of first combination of identification-field values that satisfy the filtering condition. The filtering condition includes the values of a part of identification fields.

When determining that the query request includes the second combination of identification-field values as the query condition and the target time, it indicates that the query request is used for querying the numerical value corresponding to the target time and the second combination of identification-field values. Thus, it directly performs query in the second information table according to the storage identity representing the second combination of identification-field values and the target time to obtain the target numerical value corresponding to the target time and the storage identity representing the second combination of identification-field values. The second information table stores the storage identity representing the second combination of identification-field values, the target time, and the target numerical value.

In some embodiments, in the above Step 202, the operation of obtaining a first combination of identification-field values satisfying the filtering condition by performing a query, in accordance with the filtering condition, among a plurality of first combinations of identification-field values stored in a first information table includes:

sending a first reading request to the first apparatus where the first information table is stored to enable the first apparatus to read the first combination of identification-field values satisfying the filtering condition from the first information table. The first reading request includes the filtering condition.

Specifically, the data query apparatus sends the first reading request to the first apparatus. The filtering condition is included in the first reading request. The first apparatus receives the first reading request, obtains the filtering condition from the first reading request, looks up in the first information table according to the filtering condition, and obtains the first combination of identification-field values satisfying the filtering condition.

In some embodiments, in the above Step 203, the operation of obtaining a target numerical value corresponding to the target time and the storage identity by performing a query in a second information table in accordance with the storage identity representing the second combination of identification-field values includes:

sending a second reading request to the second apparatus where the second information table is stored to enable the second apparatus to determine the storage identity representing the second combination of identification-field values, and to read the target numerical value corresponding to the storage identity and the target time from the second information table. The second reading request includes the second combination of identification-field values and the target time.

Specifically, the data query apparatus sends the second reading request to the second apparatus. The second combination of identification-field values and the target time are included in the second reading request. The second apparatus receives the second reading request, obtains the second combination of identification-field values and the target time from the second reading request, determines the storage identity representing the second combination of identification-field values, looks up in the second information table according to the determined storage identity and the target time, and obtains the target numerical value corresponding to the storage identity and the target timestamp.

Other information in the first information table and the second information table and explanations or illustrations of some other nouns (for example, the first combination of identification-field values, the second combination of identification-field values) involved in this embodiment can be known with reference to the descriptions of the embodiment as shown in FIG. 1a.

As mentioned above, when it needs to query the numerical value, it can directly perform a query in the second information table on the basis of classified storage, without using any secondary index, which advantageously increases a query speed. When it needs to query the combination of identification-field values, it can directly perform a query in the first information table. The first information table has fewer data rows, and fewer secondary indexes. The query speed can be increased as well, compared with the prior art.

It should be noted that, in each of the method embodiments described above, the method embodiments are all described as a combination of a series of operations in order to brief the descriptions. However, those skilled in the art should know that, the present disclosure is not limited by the described sequence of the operations. According to the present disclosure, some steps may be performed in another sequence or performed simultaneously. Secondly, those skilled in the art should also know that, the embodiments described in the application all belong to preferred embodiments and the involved operations and modules are not necessarily indispensable for the present disclosure.

In the above embodiments, the descriptions about each embodiment focus on different key points, and the part of a certain embodiment that is not described in detail can be obtained with reference to the relevant descriptions in other embodiments.

Figure 3:
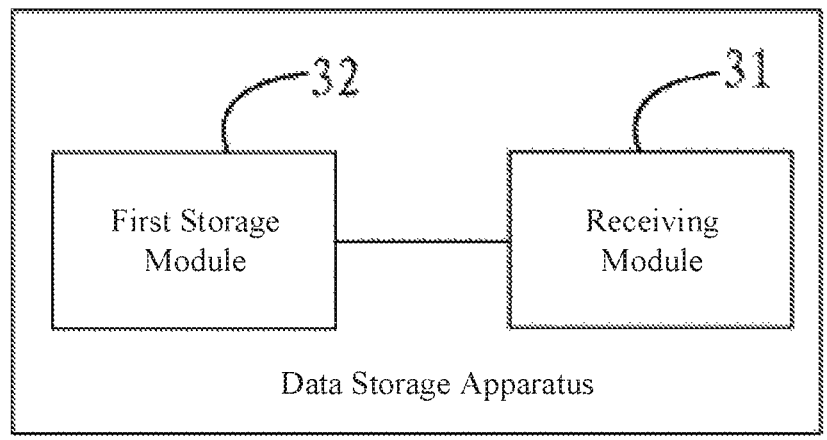
FIG. 3a is an illustrative schematic diagram of an exemplary apparatus for data storage, according to an embodiment of the present disclosure.
FIG. 3b is an illustrative schematic diagram of an exemplary apparatus for data storage, according to another embodiment of the present disclosure.
Figure 3:
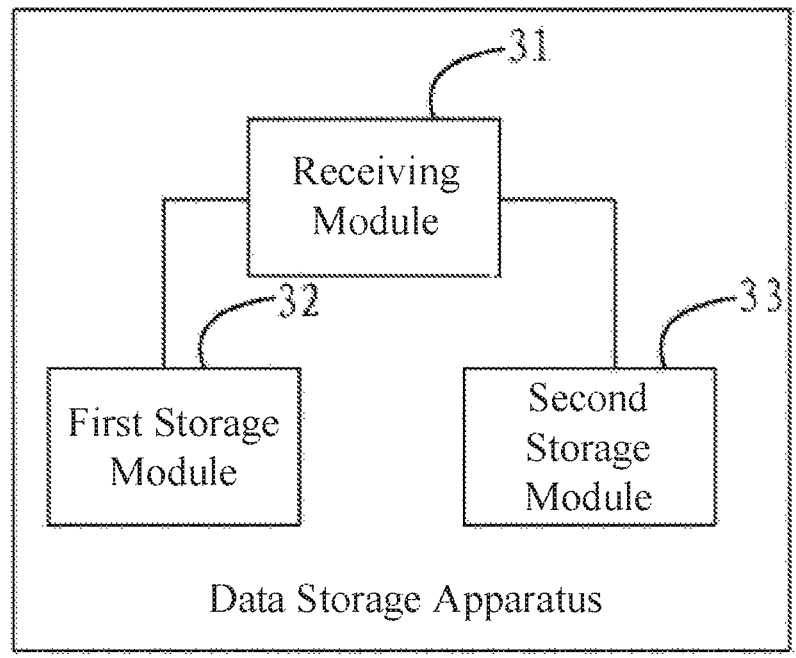

FIG. 3a is a schematic structural view of a data storage apparatus, according to an embodiment of the present disclosure. As shown in FIG. 3a, the apparatus includes: a receiving module 31 and a first storage module 32.

The receiving module 31 is configured to receive a data record to be stored.

The first storage module 32, connected to the receiving module 31, is configured to: when the data record received by the receiving module 31 includes a timestamp, a numerical value generated at a time point identified by the timestamp, and a first combination of identification-field values that can identify the numerical value, obtain a target numerical value and a target time satisfying user query needs, and a second combination of identification-field values as a query condition by the preprocessing of the data record based on the user query needs, a storage identity representing the second combination of identification-field values, the target time, and the target numerical value into a second information table correspondingly, and store the first combination of identification-field values into a first information table.

The first combination of identification-field values includes one type of values of a time-independent multi-dimensional identification field.

In some embodiments, as shown in FIG. 3b, the apparatus further includes: a second storage module 33.

The second storage module 33, connected to the receiving module 31, is configured to: when the data record does not include the timestamp and the numerical value generated at the time point identified by the timestamp, but includes the first combination of identification-field values that can identify the numerical value, store the first combination of identification-field values into the first information table.

In some embodiments, the second storage module 33 is specifically configured to: when the data record received by the receiving module 31 does not include the timestamp and the numerical value generated at the time point identified by the timestamp, but includes the first combination of identification-field values that can identify the numerical value, send a first writing request to a first apparatus where the first information table is stored to enable the first apparatus. When determining that the first information table does not have the first combination of identification-field values, the second storage module 33 is specifically configured to write the first combination of identification-field values into the first information table. The first writing request includes the first combination of identification-field values.

In some embodiments, the first storage module 32 is specifically configured to: when the data record received by the receiving module 31 includes the timestamp, the numerical value, and the first combination of identification-field values, obtain a target numerical value and a target time satisfying user query needs, and a second combination of identification-field values as a query condition by the preprocessing of the data record based on the user query, send a second writing request to a second apparatus where the second information table is stored to enable the second apparatus to determine the storage identity representing the second combination of identification-field values and to correspondingly write the storage identity, the target time, and the target numerical value into the second information table, send the first writing request to the first apparatus where the first information table is located to enable the first apparatus, when determining that the first combination of identification-field values does not exist in the first information table, to store the first combination of identification-field values into the first information table. The first writing request includes the above first combination of identification-field values. The second writing request includes the second combination of identification-field values, the target time, and the target numerical value.

Each functional module of the data storage apparatus in this embodiment can be configured to execute the flow of the data storage method as shown in FIG. 1a or FIG. 1b. The detailed working principles are not described repeatedly. Those operations can be obtained with reference to the descriptions of the method embodiments.

Through making classifications on data in the data record to be stored, the data storage apparatus in this embodiment stores the data related to time. For example, the timestamp and the numerical value are stored into the second information table. The first information table stores the time-independent contents. It has a lower data volume, and greatly reduces the workload of creation and maintenance of secondary indexes. For the contents related to time, the data record is preprocessed based on the user query needs to directly obtain information satisfying the user query needs, such as the target numerical value, the target time, and the storage identity representing the query condition. Through the preprocessing, data volume in a second information table can be reduced to a certain extent. In addition, through storing the target numerical value, the target time, and the storage identity, there is no need to create secondary indexes for the second information table. Compared with the prior art, the data storage apparatus in this embodiment greatly reduces the workload of creation and maintenance of secondary indexes. The data volume to be stored is also reduced. It greatly increases data storage speed and enhances performance of a storage system.

Figure 4:
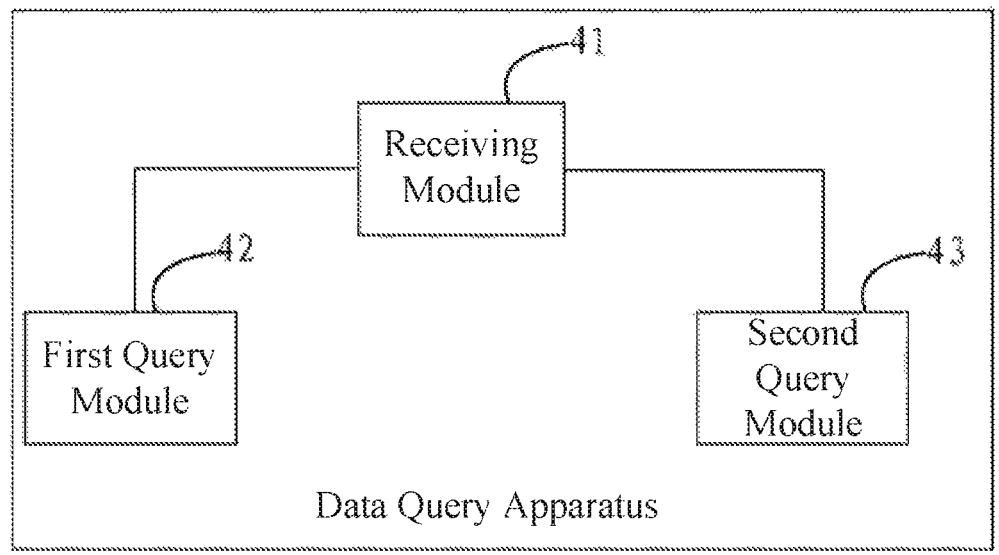
FIG. 4 is an illustrative schematic diagram of an exemplary apparatus for data query, according to an embodiment of the present disclosure.

FIG. 4 is a schematic structural view of a data query apparatus, according to an embodiment of the present disclosure. As shown in FIG. 4, the data query apparatus includes: a receiving module 41, a first query module 42, and a second query module 43.

The receiving module 41 is configured to receive a query request.

The first query module 42, connected to the receiving module 41, is configured to: when the query request received by the receiving module 41 includes a filtering condition as a query condition but does not include a target time, perform a query among a plurality of first combination of identification-field values stored in a first information table according to the filtering condition to obtain a first combination of identification-field values satisfying the filtering condition. One type of values of a time-independent multi-dimensional identification field forms a first combination of identification-field values. The filtering condition includes the values of a part of the identification fields.

The second query module 43, connected to the receiving module 41, is configured to: when the query request received by the receiving module 41 includes a second combination of identification-field values as a query condition and a target time, perform a query in a second information table according to the storage identity representing the second combination of identification-field values and the target time to obtain a target numerical value corresponding to the target time and the storage identity.

In some embodiments, the first query module 42 is specifically configured to: when the query request received by the receiving module 41 includes the filtering condition as a query condition but does not include the target time, send a first reading request to a first apparatus where the first information table is stored to enable the first apparatus to read the first combination of identification-field values satisfying the filtering condition from the first information table. The first reading request includes the filtering condition.

In some embodiments, the second query module 43 is specifically configured to: when the query request received by the receiving module 41 includes the second combination of identification-field values as a query condition and the target time, send a second reading request to a second apparatus where the second information table is stored to enable the second apparatus to determine the storage identity representing the second combination of identification-field values, and to read the target numerical value corresponding to the storage identity representing the second combination of identification-field values and the target time from the second information table. The second reading request includes the second combination of identification-field values and the target time.

Each functional module of the data query apparatus in this embodiment can be configured to execute the flow of the method embodiment as shown in FIG. 2. The detailed working principles are not described repeatedly. Those operations can be obtained with reference to the descriptions of the method embodiments.

The data query apparatus in this embodiment may be in concert with the data storage apparatus in the above embodiment. When it needs to query the numerical value, it can directly perform a query in the second information table on the basis of classified storage, without using any secondary index. It advantageously increases a query speed. When it needs to query the combination of identification-field values, it can directly perform a query in the first information table. The first information table has fewer data rows and fewer secondary indexes. It thus can increase the query speed as well, compared with the prior art.

Those skilled in the art can clearly understand the detailed working procedures of the system, apparatus, and units described above by reference to the corresponding process in the above method embodiments. For convenient and brief descriptions, the detailed descriptions are not described herein repeatedly.

In several embodiments in the present disclosure, it should be understood that, the disclosed system, apparatus, and method, can be implemented by other ways. For example, the apparatus embodiments described above are merely illustrative. For example, the units are divided merely based on logic functions. In actual implementation, they may be divided in alternative ways. For example, a plurality of units or components may be combined or integrated into another system. For another example, some features may be omitted, or may not be executed. Moreover, the coupling or direct coupling or communicative connecting between each other that is displayed or discussed may be implemented through some interfaces. Indirect coupling or communicative connecting between apparatuses or units may be implemented in an electrical, mechanical or another form.

The units demonstrated as separated parts may be or may not be physically separated. The parts displayed as units may be or may not be physical units. In other words, they may be located at one place or may be distributed to a plurality of network units. A part of units or all units may be selected depend upon actual requirements for the purpose of the solutions of the embodiments.

In addition, in each embodiment of the present disclosure, each functional unit may be integrated into one processing unit; each functional unit physically exists separately; or two or more units are integrated into one unit. The integrated units mentioned above may be implemented by using hardware functional units, or implemented by using hardware plus software functional units.

The above units for being integrated into a form of functional software units may be stored in a computer-readable storage medium. The above software functional units may be stored in one storage medium, which includes several instructions to enable a computer apparatus (may be a personal computer, a server, or a network apparatus, and so on) or a processor to execute a part of steps of the method described in each embodiment of the present disclosure. The storage mentioned above medium includes: a USB drive, a mobile hard disk drive, a Read-Only Memory (ROM), a Random Access Memory (RAM), a magnetic disc, or an optical disc, or any medium that can store program codes.

Finally, it should be stated that, the above embodiments are merely intended to illustrate the technical solutions of the present disclosure, rather than limiting the present disclosure. Although the present disclosure has been described in great detail with reference to the above-described embodiments, it should be understood that modifications can be made to technical solutions recorded in each of the above-described embodiments, or equivalent substitutions can be made to some parts of technical solutions by those skilled in the art. On the other hand, these modifications or substitutions do not cause the essence of the corresponding technical solutions to depart from the spirits and scopes of the technical solutions in each embodiment of the present disclosure.

What is claimed is:

1. A method for storing data, the method comprising:
receiving a data record to be stored; and
when the data record includes a timestamp, a numerical value generated at a time point identified by the timestamp, and a first combination of identification-field values that can identify the numerical value:
obtaining a target numerical value and a target time satisfying a user query, and a second combination of identification-field values as a query condition by the preprocessing of the data record based on the user query;
storing a storage identity representing the second combination of identification-field values, the target time, and the target numerical value into a second information table correspondingly; and
storing the first combination of identification-field values into a first information table,
wherein the first combination of identification-field values includes one type of values of a time-independent multi-dimensional identification field, and
wherein the storage identity is retrieved without using a secondary index when performing a query to the second information table.

2. The method of claim 1, further comprising:
when the data record does not include the timestamp and the numerical value generated at the time point identified by the timestamp, but includes the first combination of identification-field values that can identify the numerical value:
storing the first combination of identification-field values into the first information table.

3. The method of claim 2, wherein storing the first combination of identification-field values into the first information table includes:
sending a first writing request to a first apparatus where the first information table is stored in order to enable the first apparatus to write the first combination of identification-field values into the first information table when determining that the first information table does not include the first combination of identification-field values,
wherein the first writing request includes the first combination of identification-field values.

4. The method of claim 2, wherein storing the storage identity representing the second combination of identification-field values, the target time, and the target numerical value into the second information table includes:
sending a second writing request to a second apparatus where the second information table is stored in order to enable the second apparatus to determine the storage identity representing the second combination of identification-field values and write the storage identity, the target time, and the target numerical value correspondingly into the second information table,
wherein the second writing request includes the second combination of identification-field values, the target time, and the target numerical value.

5. The method of claim 1, wherein storing the first combination of identification-field values into the first information table includes:
sending a first writing request to a first apparatus where the first information table is stored in order to enable the first apparatus to write the first combination of identification-field values into the first information table when determining that the first information table does not include the first combination of identification-field values,
wherein the first writing request includes the first combination of identification-field values.

6. The method of claim 1, wherein storing the storage identity representing the second combination of identification-field values, the target time, and the target numerical value into the second information table includes:
sending a second writing request to a second apparatus where the second information table is stored in order to enable the second apparatus to determine the storage identity representing the second combination of identification-field values and write the storage identity, the target time, and the target numerical value correspondingly into the second information table,
wherein the second writing request includes the second combination of identification-field values, the target time, and the target numerical value.

7. An apparatus for storing data, comprising:
a memory storing a set of instructions; and
one or more processors configured to execute the set of instructions to cause the apparatus to perform:
receiving a data record to be stored; and
when the data record includes a timestamp, a numerical value generated at a time point identified by the timestamp, and a first combination of identification-field values that can identify the numerical value:
obtaining a target numerical value and a target time satisfying user query, and a second combination of identification-field values as a query condition by a preprocessing of the data record based on the user query;

storing a storage identity representing the second combination of identification-field values, the target time, and the target numerical value into a second information table correspondingly; and storing the first combination of identification-field values into a first information table, wherein the first combination of identification-field values includes one type of values of a time-independent multi-dimensional identification field, and wherein the storage identity is retrieved without using a secondary index when performing a query to the second information table.

8. The apparatus of claim 7, wherein the one or more processors are configured to execute the set of instructions to cause the apparatus to further perform:

when the data record does not include the timestamp and the numerical value generated at the time point identified by the timestamp, but includes the first combination of identification-field values that can identify the numerical value:

storing the first combination of identification-field values into the first information table.

9. The apparatus of claim 8, wherein the one or more processors are configured to execute the set of instructions to cause the apparatus to further perform:

when the data record does not include the timestamp and the numerical value generated at the time point identified by the timestamp, but includes the first combination of identification-field values that can identify the numerical value:

sending a first writing request to a first apparatus where the first information table is stored in order to enable the first apparatus to write the first combination of identification-field values into the first information table when determining that the first information table does not include the first combination of identification-field values, wherein the first writing request includes the first combination of identification-field values.

10. The apparatus of any one of claim 8, wherein the one or more processors are configured to execute the set of instructions to cause the apparatus to further perform:

when the data record includes the timestamp, the numerical value generated at a time point identified by the timestamp, and the first combination of identification-field values that can identify the numerical value:

obtaining the target numerical value and the target time that satisfy user query, and a second combination of identification-field values as a query condition by the preprocessing of the data record based on the user query;

sending a second writing request to a second apparatus where the second information table is stored in order to enable the second apparatus to determine the storage identity representing the second combination of identification-field values and write the storage identity, the target time, and the target numerical value correspondingly into the second information table; and sending a first writing request to a first apparatus where the first information table is stored in order to enable the first apparatus to write the first combination of identification-field values into the first information table when determining that the first information table does not include the first combination of identification-field values, wherein the first combination of identification-field values includes one type of values of a time-independent multi-dimensional identification field, and the second writing request includes the second combination of identification-field values, the target time, and the target numerical value.

11. The apparatus of any one of claim 9, wherein the one or more processors are configured to execute the set of instructions to cause the apparatus to further perform:

when the data record includes the timestamp, the numerical value generated at a time point identified by the timestamp, and the first combination of identification-field values that can identify the numerical value:

obtaining the target numerical value and the target time that satisfy user query, and a second combination of identification-field values as a query condition by the preprocessing of the data record based on the user query;

sending a second writing request to a second apparatus where the second information table is stored in order to enable the second apparatus to determine the storage identity representing the second combination of identification-field values and write the storage identity, the target time, and the target numerical value correspondingly into the second information table; and sending a first writing request to a first apparatus where the first information table is stored in order to enable the first apparatus to write the first combination of identification-field values into the first information table when determining that the first information table does not include the first combination of identification-field values, wherein the first combination of identification-field values includes one type of values of a time-independent multi-dimensional identification field, and the second writing request includes the second combination of identification-field values, the target time, and the target numerical value.

12. The apparatus of claim 7, wherein the one or more processors are configured to execute the set of instructions to cause the apparatus to further perform:

when the data record includes the timestamp, the numerical value generated at a time point identified by the timestamp, and the first combination of identification-field values that can identify the numerical value:

obtaining the target numerical value and the target time that satisfy user query, and a second combination of identification-field values as a query condition by the preprocessing of the data record based on the user query;

sending a second writing request to a second apparatus where the second information table is stored in order to enable the second apparatus to determine the storage identity representing the second combination of identification-field values and write the storage identity, the target time, and the target numerical value correspondingly into the second information table; and sending a first writing request to a first apparatus where the first information table is stored in order to enable the first apparatus to write the first combination of identification-field values into the first information table when determining that the first information table does not include the first combination of identification-field values, wherein the first combination of identification-field values includes one type of values of a time-independent multi-dimensional identification field, and the second writing request includes the second combination of identification-field values, the target time, and the target numerical value.

13. A non-transitory computer readable medium that stores a set of instructions that is executable by at least one processor of an apparatus to cause the apparatus to perform a method for storing data, the method comprising:

receiving a data record to be stored; and when the data record includes a timestamp, a numerical value generated at a time point identified by the timestamp, and a first combination of identification-field values that can identify the numerical value:

obtaining a target numerical value and a target time satisfying a user query needs, and a second combination of identification-field values as a query condition by the preprocessing of the data record based on the user query needs;

storing a storage identity representing the second combination of identification-field values, the target time, and the target numerical value into a second information table correspondingly; and storing the first combination of identification-field values into a first information table, wherein the first combination of identification-field values includes one type of values of a time-independent multi-dimensional identification field, and wherein the storage identity is retrieved without using a secondary index when performing a query to the second information table.

* * * * *